Feb. 9, 1943. H. G. RENNER 2,310,316
CLINCH-ON NUT AND METHOD OF MANUFACTURE
Filed July 16, 1940

INVENTOR.
HAROLD G. RENNER
BY
ATTORNEYS

Patented Feb. 9, 1943

2,310,316

UNITED STATES PATENT OFFICE 2,310,316

CLINCH-ON NUT AND METHOD OF MANUFACTURE

Harold G. Renner, Detroit, Mich.

Application July 16, 1940, Serial No. 345,815

3 Claims. (Cl. 10—86)

This invention relates to clinch-on nuts, and to processes of manufacture thereof. Such nuts, provided with means whereby they may be clinched or riveted in position upon sheet metal or other material desired to be held by screws or bolts, are used in large numbers in connection with the manufacture of motor cars, refrigerators, stoves and other sheet metal articles. The clinchable or rivetable means serves merely to hold the nut in position upon the work temporarily and until the bolt or screw is tightened into place to provide the permanent fastening.

The primary object of the present invention is to provide a clinch-on nut constituting an improvement upon that disclosed in my previously granted patent, No. 1,757,142, issued May 6, 1930, and to provide improved means whereby such a nut may be fastened to the sheet metal, or other work to be held, more easily, and with lighter clinching or riveting apparatus. A related object is to provide such an improved nut so designed that less metal is required to be deformed in the clinching operation than with previously known clinch nut designs.

Still another object is to provide an improved clinch-nut, and method of forming the same, which nut and method are more economical than those now known.

Other objects and advantages will be apparent from the following description, wherein reference is made to the accompanying drawing illustrating a preferred embodiment of my invention, and wherein similar reference numerals designate similar parts throughout the several views.

Figure 1:
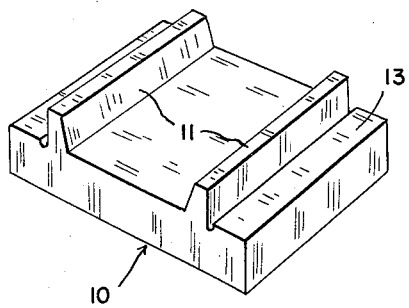
Fig. 1 is a perspective view of a nut blank of the type from which my improved nut is formed.
Figure 2:
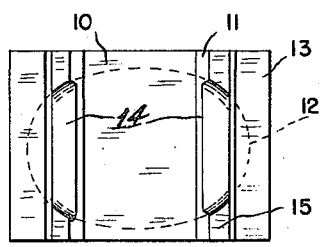
Fig. 2 is a plan view of the upper face of the blank, showing the cross-sectional outline of the punch in dotted lines to indicate the manner and area in which it is pressed to form the securing tongues.

The blanks from which the nuts are formed may be initially shaped by rolling or extruding the same through a die in the manner described in said patent, or in any other suitable or desired manner. In the preferred form shown in Figs. 1–4, ribs 11 extend longitudinally of the blank. The ribs have vertical outside walls and inclined inside walls, to assist in upsetting, as in my previously patented construction, but the ribs may be of lesser height than in my previously patented nuts, for a reason which will presently appear. Prior to separation of the blanks from the rolled bar stock, or after such separation, each blank, or the area of the bar from which each blank is to be formed, is struck with a punch, 12, the form and relative proportions of which are clearly shown in Figs. 2 and 3. The punch is of such size and so aligned with the ribs, as shown in Fig. 2, that it drives down the central portions 14 of each of the ribs 11, leaving the ends upstanding, as indicated at 15 in Fig. 4. The sides and ends of the ribs and nut blank are so backed up during the punching operation, by means of a suitable die (unshown), that only the four end portions 15 of the ribs, which are not struck by the punch, remain free to flow, and that the metal in these areas can move only upwardly. The portions 15 are thus elongated, to form holding tongues, adapted to project through the hole as 22 in the sheet metal, 20, to which the nut is to be applied.

Figures 3, 4, 5:
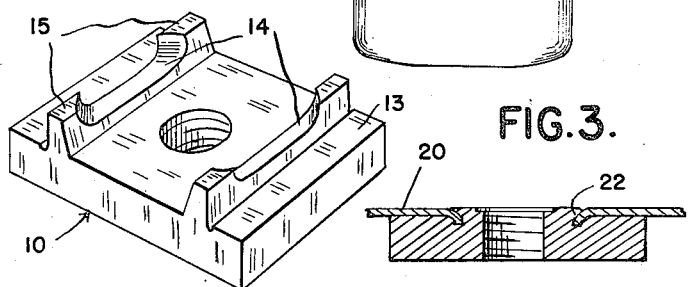
Fig. 3 is a side elevational view of a punch member used to form the securing tongues.
Fig. 4 is a perspective view of the finished clinch nut.
Fig. 5 is a sectional view of one of my improved clinch nuts secured in place upon a sheet metal support.
Figure 6:
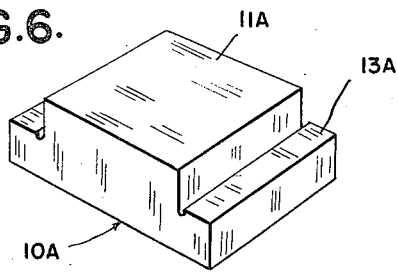
Fig. 6 is a perspective view similar to Fig. 1 of a modified blank from which a somewhat different type of nut embodying the present invention may be formed.
Figure 7:
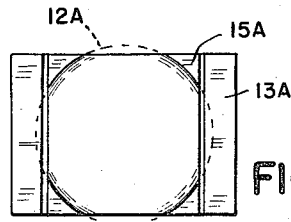
Fig. 7 is a plan view, similar to Fig. 2, of the upper face of the blank of Fig. 6, showing the area of the punch employed, and the method of alignment thereof, in forming the modified nut.
Figure 9:
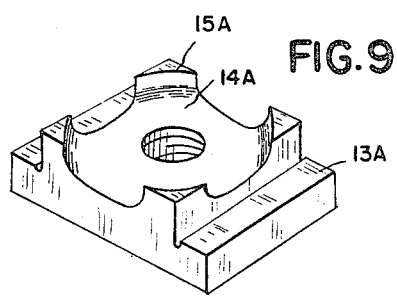
Fig. 9 is a perspective view similar to Fig. 4, of the complete modified clinch nut.
Figure 8:
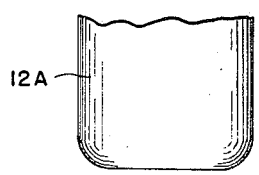
Fig. 8 is a side elevational view of the working portion of the punch.

Due to the elongating effect upon the end portions 15 of the punching operation, the ribs 11 may be of lesser height than would be required if they were to be used themselves to form the holding portions, as in the construction shown in my previous patent above referred to. The elongating effect is considerable, since the metal depressed in the central areas 14 must flow into the end or tongue-forming areas 15. Moreover the degree of elongation is subject to control by varying the stroke of the punch, or, in other words, the extent to which the central areas 14 are depressed. The blanks are then ready for piercing and tapping, and separation from the bar stock if this has not previously been done. The manner in which the nuts are applied to the sheet metal is shown in Fig. 5.

In the somewhat modified construction shown in Figs. 6–9, the nut blank 10A is provided, in place of the ribs 11, with a central raised land 11A, extending the full width of the nut except for the shoulders 13A, which are arranged to abut the sheet metal to which the nut is to be applied, as do the portions 13 of the embodiment first described. The blank 10A is suitably backed in a die (unshown), with the raised land 11A facing the punch, and such land is struck centrally with a circular punch 12A having a rounded end, aligned in the manner shown in Fig. 7. The diameter of the punch exceeds the length and width of the land 11A, but is less than the diagonal dimensions thereof, thereby leaving four unstruck corners 15A, which form securing tongues analogous to the tongues 15 of the first described embodiment. The metal in the central portion of the land is forced downwardly, substantially in the manner shown in Fig. 9, while the unstruck holding tongue sections are elongated by the tendency of the metal to flow upwardly in these areas, the metal being backed in such manner that it can flow in no other direction. The nut is then pierced and tapped, and is ready for use in the manner described in connection with the first embodiment. The height of the land 11A may be less than the required length of the tongues, because of the tendency of the metal to flow upwardly in the manner described.

The word "downward," as used in the present specification and claims, refers to a direction generally away from the punch and in the line of its path of movement. It will be appreciated, in other words, that this has no necessary or intended reference to the horizon.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

I claim:

1. The method of manufacturing clinch-on nuts and the like which comprises providing a blank with a raised section of substantial area, restricting the outward and downward flow of the metal of the blank, and striking said raised section with a punch member whose effective area is less than the area of said section, whereby the portions of said section which are not covered by said punch member are caused to flow upwardly to form securing tongues.

2. The method of forming clinch-on nuts and the like which comprises providing a blank having a body portion and having at least one thicker raised and upstanding intermediate portion, restricting the outward and downward flow of the metal of such intermediate portion, and forcing against such intermediate portion a metal forming member having an operative face of lesser cross sectional area than the area of said intermediate portion, whereby the parts of said intermediate portion not engaged by said face are caused to flow upwardly in a direction opposite to that from which the metal forming member is applied, to form securing tongues.

3. The method of forming clinch-on nuts and the like which comprises providing a blank having a substantially rectangular raised central portion of substantial thickness, and forcing against said raised central portion a metal forming member having an operative face of lesser cross sectional area than the area of said central portion, and generally oval in shape, whereby the parts of said central portion not engaged by said face are caused to flow upwardly in a direction opposite to that from which the metal forming member is applied, to form securing tongues.

HAROLD G. RENNER.